June 7, 1966  A. BOTTOMLEY  3,255,287
METHOD OF FORMING SYNTHETIC KNOPPED FILAMENTS
Original Filed July 1, 1960
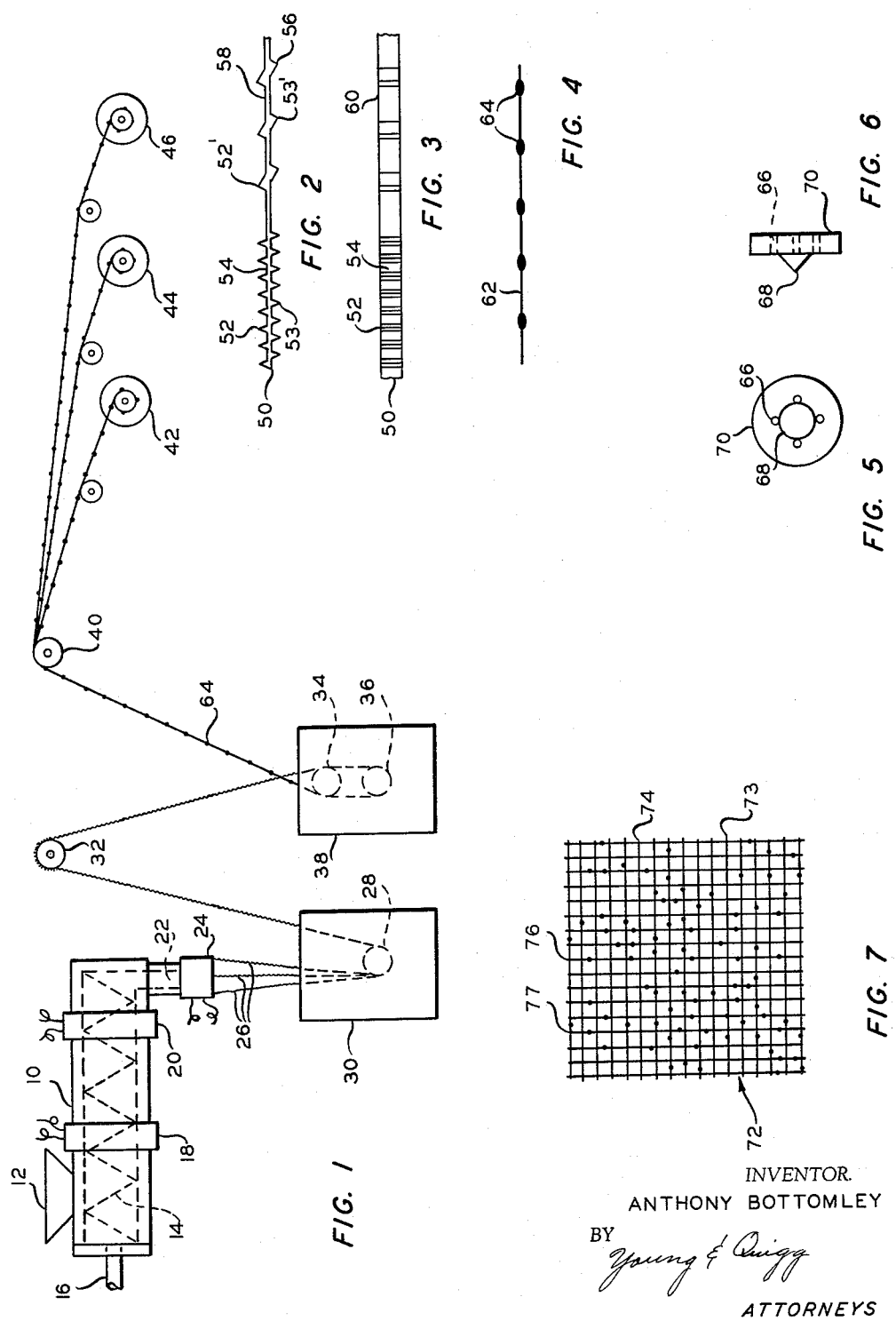
INVENTOR.
ANTHONY BOTTOMLEY
BY
*Young & Quigg*
ATTORNEYS :::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::

3,255,287
METHOD OF FORMING SYNTHETIC KNOPPED FILAMENTS
Anthony Bottomley, Maplewood, N.J., assignor to Phillips Petroleum Company, a corporation of Delaware
Original application July 1, 1960, Ser. No. 40,349, now Patent No. 3,127,915, dated Apr. 7, 1964. Divided and this application Sept. 19, 1963, Ser. No. 310,001
11 Claims. (Cl. 264—167)

This is a division of application Ser. No. 40,349, filed July 1, 1960, which has matured to Patent No. 3,127,915, issued April 7, 1964.

This invention relates to a process for making synthetic knopped filaments from resins and polymers.

Personnel in the synthetic fibers industry have felt for some time that a knop monofilament or multifilament with fibers on individual filaments are desirable and useful to the textile and related industries for producing different designs in fabrics and for use in coarse woven materials. Until this invention, no simple satisfactory method had been developed to accomplish this novel effect.

Accordingly, it is an object of the invention to provide knopped filaments of polymers and resins which are useful in the textile and related industries. Another object is to provide a simple process for continuously forming knop filaments at a fast rate. A further object is to provide a process for making knop filaments which utilize the same equipment as that utilized in producing ordinary synthetic filaments. Other objects of the invention will become apparent to those skilled in the art upon consideration of the accompanying disclosure.

One product of the invention comprises a knopped monofilament of normally solid polymer or resin having knops spaced somewhat uniformly along the length of the filament, said filament being drawn and oriented. A broad embodiment of the process of the invention comprises extruding fluid polymer thru a small orifice so as to form an extrudate having a somewhat regular "saw-toothed" configuration along two opposite surfaces and thereafter drawing the extrudate into a filament whereby knops are formed along the filament. The formation of an extrudate having "saw-toothed" configuration or two serrated opposite surfaces along the length of the extrudate is accomplished in ordinary extrusion equipment for making plastic and resin monofilaments. Practically all normally solid resins and plastics may be extruded into monofilaments by forming a melt of the material to be extruded in the extruder and forcing the melt thru small circular orifices in an extrusion die. The saw-toothed extrudate is formed by regulating the viscosity of the melt thru temperature control and control of the extrusion pressure so that a high shear stress is applied to the material as it passes into the orifices thru which it is being extruded. This causes a melt fracture and undulation of the extrudate passing thru the orifice. The disturbance in the melt caused by the fracture results in vibration of the melt across the entrance to the orifice and production of the serrated or undulating extrudate. Regardless of what causes the formation of the serrated or "saw-toothed" extrudate and the theories regarding the same, the invention is best practiced by setting up an extrusion process for any given polymer or resin wherein the melt is at sufficient temperature that it extrudes into a smooth monofilament, and then gradually decreasing the temperature of the melt in the extruder and/or increasing the extrusion pressure until an extrudate is formed which is of substantially regular saw-toothed or serrated configuration on two opposite sides. Instead of being of cylindrical cross section, the extrudate is of either irregular or of generally rectangular cross section with two relatively smooth parallel sides and two plainly serrated or saw-toothed sides. With some melts, the extrudate has the configuration of an irregular, threaded rod. The serrated extrudate is extruded at rates equal to or faster than the rate of extrusion of a smooth monofilament from any given resin or plastic and the serrations or teeth on the extrudate can be made perfectly regular as to spacing and size when extruding some melts by merely extruding at constant pressure and flow rate, the flow rate, with constant power, being controlled by temperature control of the melt at the die. With other melts, the extrudate is somewhat irregular with the undulations appearing on all sides of the extrudate. All of these serrated extrudates draw into knopped filaments.

In order to facilitate extrusion of a melt into a serrated, undulating, or saw-toothed extrudate, strand, or filament, the temperature of the extruder at the die is maintained lower by about 25 to 75° F. than in the first zone of the extruder, with decreasing temperature downstreamwise.

It has been found that the serrated or saw-toothed extrudate of various polymers and resins can be drawn after cooling with or without subsequent heating of the extrudate and drawing the extrudate either cold or at elevated temperature so as to leave knops regularly spaced along the drawn filament. In drawing the extrudate, there is apparently a partial separation between each pair of teeth or serrations on opposite sides of the extrudate and the next pair of teeth or serrations. The material between these pairs of teeth draws substantially and the teeth or serrations tend to align themselves with the filament and also apparently are drawn so as to form relatively smooth knops elongated lengthwise of the filament. Depending somewhat upon the character of the polymer or resin, the extrudate may be darwn in a ratio of about 3:1 to 10:1. As in drawing ordinary monofilaments of resins and polymers, the drawing of the serrated extrudate orients the filament and greatly increases its strength. The maximum draw to which the extrudate can be subjected depends upon the ductility of the extruded material. With some polymers or resins the drawing ratio is limited to 2 or 3 to 1 while with others it may be as high as 10 to 1 and even higher.

The process of the invention is applicable to all sorts of polymers and resins which are normally solid and lend themselves to extrusion from a melt into smooth monofilaments. Polymers and resins which are readily amenable to extrusion into a serrated extrudate, followed by drawing the extrudate to form regularly spaced knops therein, comprise the polymers of mono-1-olefins and, particularly, those having 2 to 8 carbon atoms per molecule. The polymer melt may comprise a single homopolymer, a copolymer, a blend of homopolymers, a blend of copolymers, and mixed blends of homopolymers and copolymers. Thus, a blend of a homopolymer of ethylene and a homopolymer of propylene may be extruded and drawn in accordance with the invention to form a knopped filament. A variation in this blend comprises forming a copolymer of ethylene and 1-butene which is then blended with the polypropylene. In this latter blend the 1-butene is in the range of about 1 to 5 weight percent of the copolymer to produce a filament which draws most desirably at a high ratio. The amount of polyethylene in the blend is preferably in the range of 25 to 90 weight percent, including the 1-butene constituent of the copolymer when such is used.

In addition to polymers and resins formed from mono-1-olefins, thermoplastic resins and blends of these resins with each other and with other resins are amenable to extrusion and drawing in accordance with the invention. So also are such plastics or resins as polyvinyl chloride of high molecular weight and copolymer of butadiene and acrylonitrile of high molecular weight. In fact, the invention is applicable to any resin, polymer, or blend of resins and polymers which can be extruded into smooth filaments and drawn. Of course, some resins and polymers and blends thereof have better drawing properties because of their better ductility than other resins and blends.

A preferred method of preparing polymers of aliphatic mono-1-olefins and, particularly, of ethylene, is described in detail in the U.S. patent of Hogan and Banks, 2,825,721, issued March 4, 1958. This particular method utilizes a chromium oxide catalyst containing hexavalent chromium deposited on a support of silica, alumina, silica-alumina, zirconia, thorea, etc. In the method of this patent, olefins can be polymerized in the presence of a hydrocarbon diluent, for example an acyclic, alicyclic, or aromatic compound which is inert to the olefin feed and in which the polymer is soluble. The reaction is usually carried out at temperature between about 150° F. and about 450° F. and, usually, under a pressure sufficient to maintain the reactant and diluent in the liquid state. The polymers produced by this method, particularly the polymers of ethylene, are characterized by having an unsaturation which is principally either transinternal or terminal vinyl, depending on the particular process conditions employed. When low reaction temperatures in the range of about 150° F. to about 320° F., and a mobile catalyst are used for polymerization, the product polymer is predominantly terminal vinyl in structure. When the polymerization is carried out at higher temperatures and in a fixed catalyst bed, the polymer has predominately trans-internal unsaturation. Polymers prepared by both methods are also characterized by their high densities and high percentage of crystallinity at ambient temperatures. These polymers have a density in the range of about 0.95 to 0.98 (gram per cubic centimeter) and they may be admixed with a polymer of lower density for producing knop filaments.

Other procedures which employ different catalyst may also be used for preparing olefin polymers. For example, suitable polymeric starting materials can be prepared in the presence of organometallic compounds, such as triethylaluminum plus titanium tetrachloride, mixtures of ethylaluminum halides with titanium tetrachloride, and the like. Another group of catalysts which can be used comprises a halide of a Group IV metal such as, for example, titanium tetrachloride, silicon tertabromide, zirconium tetrachloride, tin tetrabromide, etc., with one or more free metals selected from the group consisting of sodium, potassium, lithium, rubidium, zinc, cadmium, and aluminum.

A more complete understanding of the invention may be had by reference to the accompanying schematic drawing of which FIGURE 1 is a flow illustrating a preferred embodiment of the process of the invention; FIGURE 2 is a view in elevation of a length of serrated or saw-toothed extrudate of polymer with a section of the extrudate drawn; FIGURE 3 is a view of a serrated or saw-toothed extrudate taken at 90° from the elevation of FIGURE 2; FIGURE 4 is a view of a section of drawn extrudate or filament with knops thereon; FIGURE 5 is a plan view of an extrusion die; FIGURE 6 is a side view of the die of FIGURE 5; and FIGURE 7 is a plan view of a piece of woven material containing knop filaments of the invention.

Referring to FIGURE 1 an extruder 10 having a feed funnel 12 and a screw 14 to be driven by power applied to shaft 16 is provided with surrounding electrical heating elements 18 and 20. A conduit or passageway 22 connects with the downstream end of the extruder and with a die within heating element 24. It is to be understood that other types of heating means may be utilized to maintain the melt within the extruder and within the die at the desired temperature. The solid particulate resin or blend of resins and polymers to be extruded is introduced to the extruder thru hopper 12 and is forced thru the extruder from left to right by operation of screw 14. A melt is formed as the material passes thru the extruder and the melt is forced thru the orifices in the die to form fluid strands 26.

As stated hereinabove, it is desirable to set up the extrusion process so that the extrudate is a smooth cylinder and then decrease the temperature and increase the pressure applied to the screw until the extrudate undulates in the orifice and forms the desired serrated or saw-toothed configuration. However, after establishing the conditions of pressure and temperature at which any given resin or blend extrudes into an extrudate of the desired configuration (serrated or saw-toothed), these conditions may be established ab initio. Since the required temperature and pressure for forming the serrated extrudate with any given polymer resin or blend thereof varies with the characteristics of the material, satisfactory operating conditions can readily be established in the foregoing manner.

The serrated or saw-toothed extrudate 26 is passed into water-cooling tank 30 over roller 28 and then to roller 32 above the tank. The extrudate is cooled in tank 30 to solidify same. The temperature in tank 30 may be controlled within a wide range such as from normal atmospheric or room temperature to 125 or 150° F., depending upon the melt temperature of the resin or polymer. Also, other coolants than water which are inert to the material being extruded are operable in the process. The extrudate then passes from roller 32 over roller 34 and 36 in steam cabinet 38 and onto roller 40 from which the filaments pass to spools 42, 44, 46, etc. The steam bath in cabinet 38 facilitates the drawing process which is controlled by regulating the speed of roller 40 relative to the speed of roller 32. The drawing of the extrudate between roller 34 and 40 forms knops 64 in substantially regular spacing along the drawn filament. It is also feasible to draw the extrudate at room temperature by omitting the application of heat to the extrudate in cabinet 38. The cooling in cooling tank 30 and the steaming and drawing procedures, as applied to ordinary cylindrical monofilament, are conventional steps in the art and may be applied to the serrated or saw-toothed extrudate in the same manner.

FIGURE 2 illustrates the extrudate of 100% polypropylene. The upper and lower sides of the extrudate 50 are serrated or saw-toothed in configuration. Teeth or serrations 52 and 53 are surprisingly uniformly spaced and serrations 53 are obliquely opposite serrations 52 so as to be directly opposite the interval or valley between the serrations or teeth 52. The valleys between the teeth or serrations are substantially flat as at 54. Not all melts extrude as uniformly undulating as shown in FIGURE 2. The copolymer of ethylene and 1-butene described below extruded into a serrated strand somewhat less regular and the serrations appeared on all sides of the strand which was not definitely rectangular in transverse cross section. Melts of different character vary in contour and regularity.

A section of the extrudate 50 is drawn to produce knops 56 and intervening drawn filament 58. The extrudate of FIGURE 2 is an illustration of that prepared by extruding 100% polypropylene. The knops formed by drawing the extrudate from this specific material are less smooth than knops formed in a more ductile polymer. This is probably due to the fact that the knops are not drawn to the extent to which they are drawn in a more ductile polymer and they illustrate the fact that they are formed from diagonally opposite serrations or teeth in the serrated extrudate. Each knop appears to have a section 52' and a section 53' corresponding to the teeth or serrations 52 and 53.

In FIGURE 3 the character of the edge of the teeth or serrations is shown and it is also apparent that the so-called smooth sides of the extrudate are slightly irregular, having slight undulations 60 thereon. In some melts the serrations or undulations appear to encircle the extrudate.

FIGURE 4 represents an illustration of knop filament or yarn made from a 70/30 blend of a copolymer of polyethylene and butene-1 (2% butene-1) and polypropylene. This material has high ductility and draws out well into fine monofilaments 62 with regularly spaced and smoothly elongated knops 64 therein.

FIGURES 5 and 6 illustrate one type of die used in the extrusion process. Orifices 66 are positioned in a circular pattern around a flat cone 68 at the center of die 70. This cone assists in directing the melt into the orifices and prevents the stagnation of the melt in the cone area.

FIGURE 7 illustrates a loosely woven fabric 72 containing knop filaments in both the warp and filling of the weave. Knop filaments 74 are woven into the warp and are composed of various colors and are in bands alternating with bands of regular filaments or other strands 73. The filling comprises bands of knop filaments 76 alternating with bands of other strands 77. In one fabric woven from knop yarn and polyethylene yarn made by splitting thin polyethylene sheet, four different colors of knop yarn were woven into the warp while the filling comprises one color of knop yarn 76 in bands of 8 consecutive strands and with 8 consecutive strands of polyethylene film fibers in between these bands. The resulting woven material had an interesting knoppy texture similar to a tweed and had a unique changeable color pattern when the surface was viewed from a sharp oblique angle. Woven materials from the knoppy yarns alone or in admixture with other yarns of resins or polymers or of other types of yarn are useful as fabrics for porch, yard furniture, and automobile upholstery, seat covers, grill covers for speakers, draperies and curtain materials, and the like. Over 40 different patterns of materials have been woven from knoppy polymer yarns, alone, and in admixture with standard polymer yarns, using a wide variety of colors.

The knoppy yarns of the invention can be extruded from a blend of different colored polymers to give a two-tone effect to the colored knoppy yarn thus produced. Even when producing the knopped yarn of the invention from a single color melt, the resulting knopped yarn has a two tone effect in that the knops are of deeper color than the intervening sections of drawn filament.

The following examples are presented to illustrate the invention and are not to be interpreted as unnecessarily limiting the same.

*Example I*

A dry blend of 60/40, polyethylene-polypropylene, was fed to a 1¼" Hartig extruder operating at 500° F. in the first and second zones and 480° F. in the third zone, a screw speed of 3.0 (scale-reading on the extruder), and a pressure of 2350 lbs. (gauge reading of back pressure). The molten blend was extruded through an 8 hole-0.017 orifice die. A "saw-tooth" filament was obtained and when drawn at about a 4:1 ratio over godet rolls, the first roll operating at 33 f.p.m. and the second at 138 f.p.m., the extrudate was oriented without loss of the knops. The polyethylene in the blend was made in accordance with the above-identified Hogan and Banks patent and the polypropylene was commercially available "Profax."

A blend containing from 30 to 85% polyethylene produces a good knopped filament. Preferably a blend containing about 65 to 75% polyethylene is used. The larger the quantity of polyethylene in the blend the higher the strength of the knopped filament. Results have shown that the variables controlling the characteristics of this knopped filament are: ratio of ethylene to propylene in the blend, extruded barrel temperature, screw speed, extrusion pressure, and draw ratio. Thus a different ratio of the constituents in the blend requires a slightly different combination of the other variables. As the quantity of polypropylene is varied, the variables must be changed to obtain optimum results.

*Example II*

A 100% polypropylene polymer ("Profax") was extruded under similar operating conditions to those of Example I and an apparently perfectly regular saw-toothed extrudate was produced. The extrudate was drawn at a ratio of about 3 to 1 and a knopped filament having rather rough knops was formed. This filament had less tensile strength than the filament of Example I but was of sufficient strength for use as yarn. The extrudate of FIGURE 2 is an accurate illustration of the extrudate of this example.

*Example III*

A 70/30 blend of a copolymer of polyethylene and 1-butene (containing about 2 weight percent of 1-butene and made in accordance with the Hogan and Banks patent) and polypropylene ("Profax") was extruded under conditions similar to those of Example I to form a serrated or saw-toothed extrudate which was drawn to a ratio of about 6½ to 1 to form a knopped filament. This filament had good tensile strength and the knops were smoothly elongated. The knopped filament of FIGURE 4 is a reasonably accurate representation of the filaments of this example.

*Example IV*

A copolymer of ethylene and 1-butene containing about 2 weight percent of the latter was extruded in a Hartig extruder thru a 8-hole die of 17 mil orifices in which the land length (die thickness at holes) was 40 mil. The temperatures of zones 1, 2, and 3 (consecutively downstream from the feed inlet) were 325° F.–310° F.–300° F., respectively, and the temperature of the die head was 260° F. The extrudate was at a temperature of 290° F. as it left the die. The extrusion pressure was about 4,000 p.s.i. and the screw speed was 5.0 (scale reading on the 1¼" extruder). The godet rolls were operated at 75 feet and 220 feet per minute (draw ratio about 3:1) with a steam cabinet temperature of 250° F. During the latter portion of the run, the steam cabinet temperature was dropped to 210° F. The extrudate in both instances drew well into a knoppy filament of suitable characteristics for yarn. In these filaments the knops were considerably less regularly spaced and less uniform in size and shape than in the filaments of Examples I and III.

It is essential to maintain a small ratio of land length to orifice diameter in order to extrude in the manner of the invention. It was found that with a land length of 150 mils and an orifice diameter of 20 mils the extrudate was substantially a smooth cylinder under a wide range of extrusion variables with a given melt. However, when the land length was reduced to about 10 mils, formation of a serrated extrudate was readily accomplished. A ratio of land length to orifice diameter in the range of about 0.3:1 to 3:1 is operable and it is desirable to operate in the range of about 0.5:1 to 1.5:1 for easy extrusion in serrated form.

Streamlining the channel leading to the orifices hinders extrusion in accordance with the invention. It facilitates extrusion in serrated form to extrude using a channel of cylindrical form upstream and adjacent the die. Streamlining of this channel tends to cause smooth extrusion in cylindrical form.

The filament of the invention has numerous advantages over slubbed yarns currently available. These include ease of production, economy of production, considerably lower cost, visual appearance of two color filament, and bright appearance of the yarn. While the manufacture of slubby yarns from synthetic filaments by other processes requires special expensive equipment, the knoppy or knopped yarns of this invention are readily manufactured in ordinary extrusion and drawing equipment utilized in making ordinary drawn synthetic monofilaments.

Certain modifications of the invention will become apparent to those skilled in the art and the illustrative details disclosed are not to be construed as imposing unnecessary limitations on the invention.

I claim:

1. A process for forming knopped monofilaments of polymer which comprises extruding fluid normally solid polymer thru a small round orifice having a land length to diameter ratio in the range of 0.3:1.0 to 3:1 so as to form an extrudate having a regular and substantially uniform "saw-tooth" or undulating configuration or outline along its surface; thereafter drawing said extrudate into a filament whereby knops are formed along said filament at sections of increased thickness along said extrudate.

2. The process of claim 1 wherein the diameter of said orifice is in the range of 0.005 to 0.10 inch and the ratio of land length to diameter is in the range of 0.5:1 to 1.5:1 and the drawing ratio is in the range of 3:1 to 10:1.

3. The process of claim 2 wherein said polymer is a copolymer of ethylene with a minor but substantial amount of 1-butene.

4. The process of claim 1 wherein said polymer comprises at least one polymer of an aliphatic mono-1-olefin of 2 to 8 carbon atoms.

5. The process of claim 4 wherein said polymer consists essentially of a blend of high density polyethylene of a density in the range of 0.94 and 0.98 and a high pressure polyethylene of lower density.

6. A process for forming knopped monofilaments of polymer which comprises extruding a melt of polymer thru a small round orifice having a ratio of land length to diameter in the range of 0.5:1 to 1.5:1 at a temperature and pressure which produces an extrudate in the form of a smooth cylindrical filament; gradually decreasing the temperature of said melt and increasing the extrusion pressure until the extrudate changes to one of "saw-toothed" or serrated substantially uniform configuration or outline having sections of increased diameter alternately spaced with sections of lesser diameter; continuing the extrusion of said melt into said extrudate of said configuration; and drawing the resulting extrude whereby said sections of lesser diameter draw substantially more than said sections of increased diameter to form corresponding alternate sections of drawn filament and knops.

7. A process for forming a knopped monofilament of polymer which comprises extruding a melt of a blend of a polymer of ethylene and polypropylene thru a small round orifice having a ratio of land length to diameter in the range of 0.3:1 to 3:1; regulating the temperature of the melt at the orifice and the extrusion pressure so as to form an extrudate having a somewhat regular serrated configuration along its length; cooling said extrudate; and, thereafter, drawing the extrudate into a filament whereby knops are formed at regular intervals along said filament.

8. The process of claim 7 wherein said polymer of ethylene is a copolymer of ethylene and 1-butene in which the latter is in the range of about 1 to 5 weight percent of the copolymer.

9. The process of claim 8 wherein said copolymer is in the range of 25 to 90 weight percent of said blend.

10. The process of claim 7 wherein the ratio of land length to orifice diameter is in the range of 0.5:1 to 1.5:1.

11. A process for forming an extruded strand of polymer which comprises forming a melt of said polymer in an extrusion chamber; extruding said melt thru a small orifice in said chamber having a diameter in the range of 0.005 to 0.10 inch and a ratio of land length to diameter in the range of 0.5:1 to 1.5:1, while maintaining the viscosity of the melt in the zone of said chamber adjacent said orifice sufficiently high to provide high shear stress and melt fracture, thereby producing an extruded strand having a regular saw-toothed outline or configuration with the teeth along one side of said strand being positioned opposite the intervals between teeth on the opposite side of said strand; and drawing the resulting strand at a ratio in the range of 3:1 to 10:1 to form knops thereon.

References Cited by the Examiner

UNITED STATES PATENTS

| 2,866,256 | 12/1958 | Matlin | 264—167 |
| 2,935,502 | 5/1960 | Reding | 18—8 |
| 2,991,508 | 7/1961 | Fields et al. | 264—176 |

FOREIGN PATENTS

| 566,797 | 10/1958 | Belgium. |
| 833,092 | 4/1960 | Great Britain. |
| 880,059 | 10/1961 | Great Britain. |
| 928,825 | 6/1963 | Great Britain. |
| 932,538 | 7/1963 | England. |
| 1,167,990 | 8/1958 | France. |
| 1,245,063 | 9/1960 | France. |

ALEXANDER H. BRODMERKEL, *Primary Examiner.*
ROBERT F. WHITE, *Examiner.*